US011611918B2

(12) United States Patent
Gürsu et al.

(10) Patent No.: US 11,611,918 B2
(45) Date of Patent: Mar. 21, 2023

(54) CONDITIONAL HANDOVER (CHO) EXECUTION WITH NETWORK SLICE SERVICE CONTINUITY PRIORITIZATION

(71) Applicant: NOKIA TECHNOLOGIES OY, Espoo (FI)

(72) Inventors: Halit Murat Gürsu, Munich (DE); Ömer Bulakci, Munich (DE); Muhammad Naseer-Ul-Islam, Munich (DE); Philippe Godin, Versailles (FR); Ahmad Awada, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 84 days.

(21) Appl. No.: 17/239,107

(22) Filed: Apr. 23, 2021

(65) Prior Publication Data

US 2022/0345965 A1     Oct. 27, 2022

(51) Int. Cl.
*H04W 36/00* (2009.01)
*H04W 36/08* (2009.01)

(52) U.S. Cl.
CPC . *H04W 36/00837* (2018.08); *H04W 36/0077* (2013.01); *H04W 36/00835* (2018.08); *H04W 36/08* (2013.01)

(58) Field of Classification Search
None
See application file for complete search history.

(56) References Cited

U.S. PATENT DOCUMENTS 10,992,396 B1 * 4/2021 Nahata ................. H04L 5/001
2020/0344679 A1 * 10/2020 Jin ....................... H04W 76/12

(Continued)

FOREIGN PATENT DOCUMENTS

CN    111988819 A    11/2020
EP    3589064 A1     1/2020

(Continued)

OTHER PUBLICATIONS

Nielsen et al, "Network Slicing for Ultra-Reliable Low Latency Communication in Industry 4.0 Scenarios", Aug. 2017 (Year: 2017).*

(Continued)

*Primary Examiner* — Kenny S Lin
(74) *Attorney, Agent, or Firm* — Squire Patton Boggs (US) LLP

(57) ABSTRACT

Systems, methods, apparatuses, and computer program products for conditional handover (CHO) execution with network slice service continuity prioritization are provided. A radio resource control (RRC) reconfiguration message sent by a source radio access network (RAN) node to the user equipment (UE) may include, for each CHO configuration, an associated network slice-related priority index. The UE may take this index into account when selecting a suitable cell during CHO recovery. Additionally, or alternatively, the RRC reconfiguration message sent by a source RAN node may include, for each CHO configuration, an associated network slice support information of the candidate target cell. The message may also include network slice remapping information for any network slice associated with one of the candidate target cells. Using the above network slice-related information received from the network, the UE can prioritize the cell to select during CHO recovery in case more than one suitable cell is available.

14 Claims, 4 Drawing Sheets

(56) References Cited

U.S. PATENT DOCUMENTS

2020/0351694 A1 11/2020 Chen et al.
2022/0279408 A1* 9/2022 Awada .............. H04W 74/0841

FOREIGN PATENT DOCUMENTS

WO 2020/229552 A1 11/2020
WO WO-2021239899 A1 * 12/2021

OTHER PUBLICATIONS

International Search Report and Written Opinion dated Apr. 8, 2022 corresponding to International Patent Application No. PCT/FI2022/050051.
3GPP TS 23.003 V17.1.0 (Mar. 2021), Technical Specification, 3rd Generation Partnership Project; Technical Specification Group Core Network and Terminals; Numbering, addressing and identification; (Release 17), Mar. 2021.
3GPP TS 23.501 V17.0.0 (Mar. 2021), Technical Specification, 3rd Generation Partnership Project; Technical Specification Group Services and System Aspects; System architecture for the 5G System (5GS); Stage 2 (Release 17), Mar. 2021.
3GPP TS 38.300 V16.5.0 (Mar. 2021), Technical Specification, 3rd Generation Partnership Project; Technical Specification Group Radio Access Network; NR; NR and NG-RAN Overall Description; Stage 2 (Release 16), Mar. 2021.
3GPP TS 38.423 V16.5.0 (Apr. 2021), Technical Specification, 3rd Generation Partnership Project; Technical Specification Group Radio Access Network; NG-RAN; Xn application protocol (XnAP) (Release 16), Apr. 2021.
3GPP TR 38.832 V1.0.0 (Mar. 2021), Technical Report, 3rd Generation Partnership Project; Technical Specification Group RAN; NR; Study on enhancement of Radio Access Network (RAN) slicing (Release 17), Mar. 2021.
CMCC, "Email discussion on open issues for RAN slicing SI," 3GPP Draft; R2-2010366, 3GPP TSG-RAN WG2 Meeting #112 electronic, Online, Nov. 2-13, 2020.

* cited by examiner

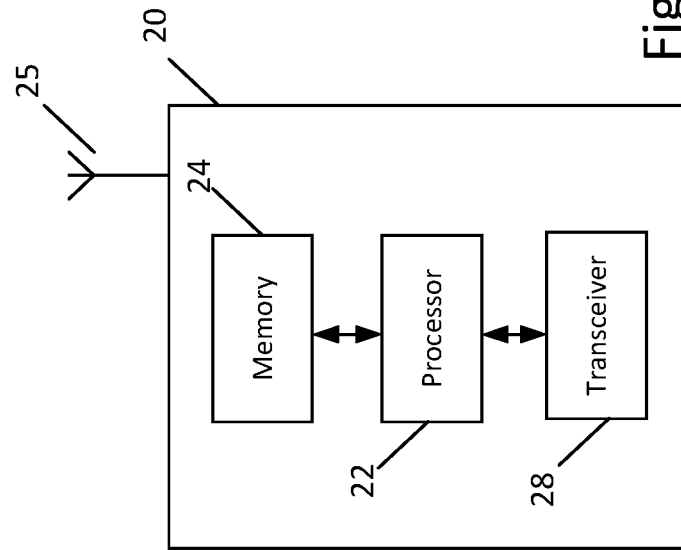
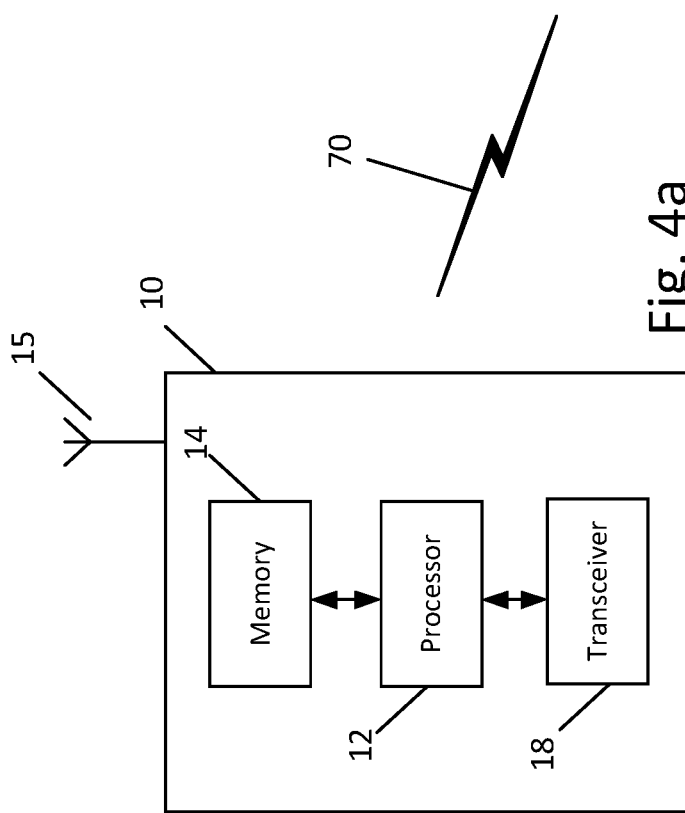

CONDITIONAL HANDOVER (CHO) EXECUTION WITH NETWORK SLICE SERVICE CONTINUITY PRIORITIZATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for conditional handover (CHO) execution with network slice service continuity prioritization.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, an apparatus may include at least one processor and at least one memory including computer program code. The at least one memory and the computer program code may be configured to, with the at least one processor, cause the apparatus at least to determine at least one conditional handover configuration. The at least one conditional handover configuration may include at least one of: network slice-related priority indexes for a set of prepared target cells, network slice support information for the set of prepared target cells, network slice-related prioritization information for the set of prepared target cells, or network slice remapping information for the set of prepared target cells. The at least one memory and the computer program code may be configured to, with the at least one processor, cause the apparatus at least to transmit, to a user equipment, a reconfiguration message comprising the at least one conditional handover configuration.

In a variant, the network slice-related priority indexes or the network slice-related prioritization information may indicate a preference among the set of prepared target cells. In a variant, the at least one memory and the computer program code may be configured to, with the at least one processor, further cause the apparatus at least to receive a conditional handover acknowledgement from at least one of the set of prepared target cells. In a variant, the at least one memory and the computer program code may be configured to, with the at least one processor, when determining the at least one conditional handover configuration, further cause the apparatus at least to determine the at least one conditional handover configuration based on the received conditional handover acknowledgement. In a variant, the conditional handover acknowledgement may indicate that a conditional handover with remapping is not possible for network slices or, the conditional handover acknowledgement may indicate a conditional handover with a remapping from a first network slice to a second network slice, or the conditional handover acknowledgement may indicate a conditional handover with no remapping.

In a variant, the reconfiguration message may include an information element that indicates the network slice-related prioritization information or the network slice-related priority indexes. In a variant, the reconfiguration message may include an information element that indicates the network slice support information or the network slice remapping information. In a variant, the network slice support information, the network slice-related prioritization information, or the network slice remapping information may be signaled as an information element at a message level.

According to a second embodiment, an apparatus may include at least one processor and at least one memory including computer program code. The at least one memory and the computer program code may be configured to, with the at least one processor, cause the apparatus at least to receive a reconfiguration message comprising at least one conditional handover configuration. The at least one conditional handover configuration may include at least one of: network slice-related priority indexes for a set of prepared target cells, network slice support information for the set of prepared target cells, network slice-related prioritization information for the set of prepared target cells, or network slice remapping information for the set of prepared target cells. The at least one memory and the computer program code may be configured to, with the at least one processor, cause the apparatus at least to perform a conditional handover recovery using the at least one conditional handover configuration.

In a variant, the at least one memory and the computer program code may be configured to, with the at least one processor, when performing the conditional handover recovery using the conditional handover configuration, further cause the apparatus at least to perform the conditional handover recovery using the conditional handover configuration to prioritize among suitable cells in a cell selection process during a conditional handover recovery. In a variant, the at least one memory and the computer program code may be configured to, with the at least one processor, when performing the conditional handover recovery using the conditional handover configuration, further cause the apparatus at least to determine a set of suitable cells from the set of prepared target cells, and select one or more cells among the set of suitable cells using the conditional handover configuration. In a variant, the at least one memory and the computer program code may be configured to, with the at least one processor, when selecting the one or more of the set of suitable cells, further cause the apparatus at least to select the one or more cells among the set of suitable cells based on the network slice-related prioritization information or the network slice-related priority indexes, or select the one or more cells among the set of suitable cells based on the network slice support information or the network slice remapping information.

In a variant, the reconfiguration message may include an information element that indicates the network slice-related prioritization information or the network slice-related priority indexes. In a variant, the reconfiguration message may include an information element that indicates the network slice support information or the network slice remapping information. In a variant, the network slice support information may be received as an information element at a message level. In a variant, the at least one memory and the computer program code may be configured to, with the at least one processor, further cause the apparatus at least to decode the information element without completely decoding the reconfiguration message.

According to a third embodiment, a method may include determining at least one conditional handover configuration. The at least one conditional handover configuration may include at least one of: network slice-related priority indexes for a set of prepared target cells, network slice support information for the set of prepared target cells, network slice-related prioritization information for the set of prepared target cells, or network slice remapping information for the set of prepared target cells. The method may include transmitting, to a user equipment, a reconfiguration message comprising the at least one conditional handover configuration.

In a variant, the network slice-related priority indexes or the network slice-related prioritization information may indicate a preference among the set of prepared target cells. In a variant, the method may include receiving a conditional handover acknowledgement from at least one of the set of prepared target cells. In a variant, the determining the at least one conditional handover configuration may include determining the at least one conditional handover configuration based on the received conditional handover acknowledgement. In a variant, the conditional handover acknowledgement may indicate that a conditional handover with remapping is not possible for network slices or, the conditional handover acknowledgement may indicate a conditional handover with a remapping from a first network slice to a second network slice, or the conditional handover acknowledgement may indicate a conditional handover with no remapping.

In a variant, the reconfiguration message may include an information element that indicates the network slice-related prioritization information or the network slice-related priority indexes. In a variant, the reconfiguration message may include an information element that indicates the network slice support information or the network slice remapping information. In a variant, the network slice support information, the network slice-related prioritization information, or the network slice remapping information may be signaled as an information element at a message level.

According to a fourth embodiment, a method may include receiving a reconfiguration message comprising at least one conditional handover configuration. The at least one conditional handover configuration may include at least one of: network slice-related priority indexes for a set of prepared target cells, network slice support information for the set of prepared target cells, network slice-related prioritization information for the set of prepared target cells, or network slice remapping information for the set of prepared target cells. The method may include performing a conditional handover recovery using the at least one conditional handover configuration.

In a variant, the performing the conditional handover recovery using the conditional handover configuration may include performing the conditional handover recovery using the conditional handover configuration to prioritize among suitable cells in a cell selection process during a conditional handover recovery. In a variant, the performing the conditional handover recovery using the conditional handover configuration may include determining a set of suitable cells from the set of prepared target cells, and selecting one or more cells among the set of suitable cells using the conditional handover configuration. In a variant, the selecting the one or more of the set of suitable cells may include selecting the one or more cells among the set of suitable cells based on the network slice-related prioritization information or the network slice-related priority indexes, or selecting the one or more cells among the set of suitable cells based on the network slice support information or the network slice remapping information.

In a variant, the reconfiguration message may include an information element that indicates the network slice-related prioritization information or the network slice-related priority indexes. In a variant, the reconfiguration message may include an information element that indicates the network slice support information or the network slice remapping information. In a variant, the network slice support information may be received as an information element at a message level. In a variant, the method may include decoding the information element without completely decoding the reconfiguration message.

A fifth embodiment may be directed to an apparatus that may include circuitry configured to cause the apparatus to perform the method according to the third embodiment or the fourth embodiment, or any of the variants discussed above.

A sixth embodiment may be directed to an apparatus that may include means for performing the method according to the third embodiment or the fourth embodiment, or any of the variants discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the third embodiment or the fourth embodiment, or any of the variants discussed above.

An eighth embodiment may be directed to a computer program product encoding instructions for causing an apparatus to perform at least the method according to the third embodiment or the fourth embodiment, or any of the variants discussed above.

BRIEF DESCRIPTION OF THE DRAWINGS

For proper understanding of example embodiments, reference should be made to the accompanying drawings, wherein:

FIG. 4*a* illustrates an example block diagram of an apparatus, according to an embodiment; and FIG. 4b illustrates an example block diagram of an apparatus, according to another embodiment.

DETAILED DESCRIPTION

Figure 1:
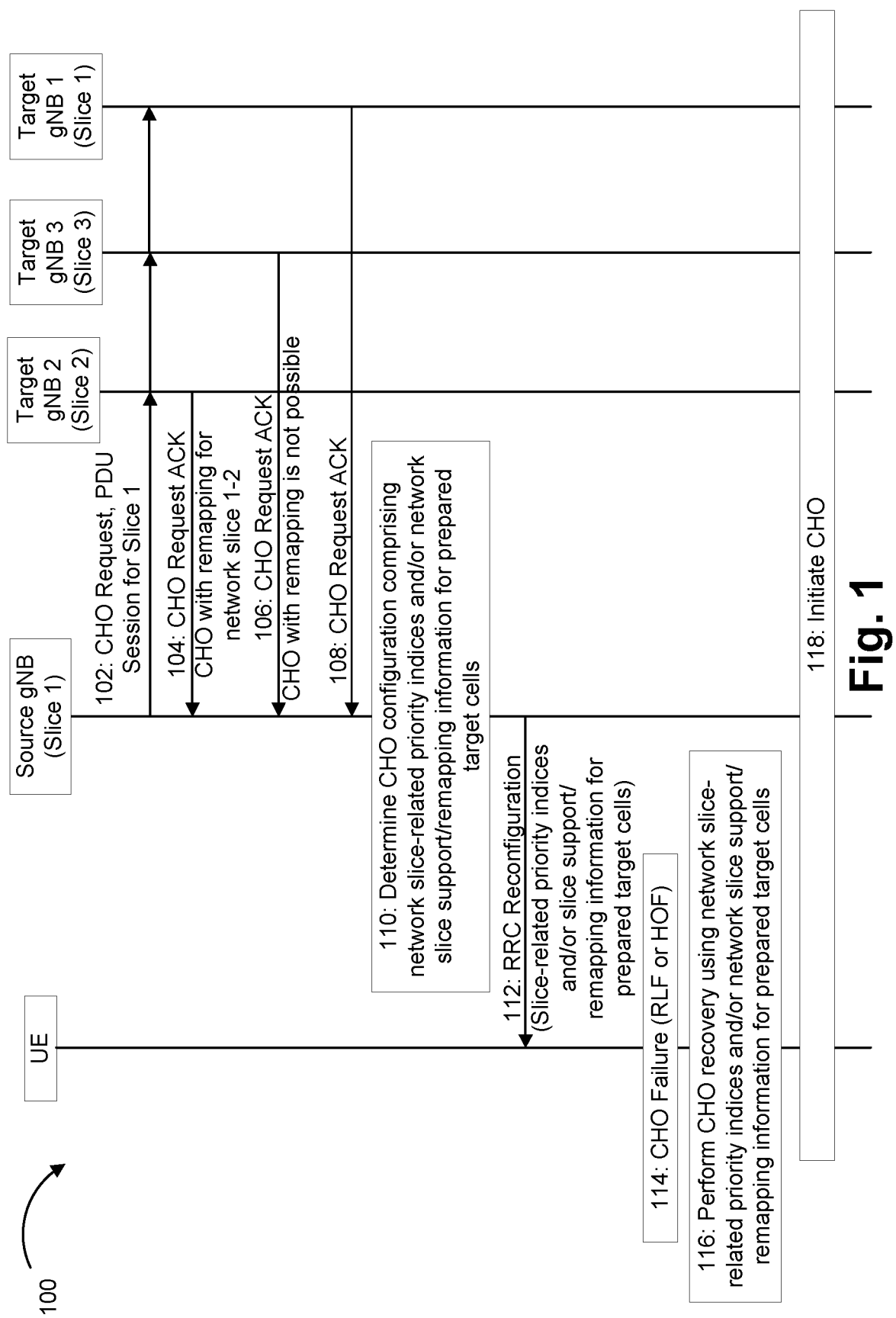
FIG. 1 illustrates an example of CHO execution with network slice service continuity prioritization, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for CHO execution with network slice service continuity prioritization is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar wording, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar wording, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Network slicing may be a feature of NR to support different services using the same underlying mobile network infrastructure. Network slices can differ either in their service requirements like URLLC and eMBB or the tenant that provides those services. A network slice may be identified via the single network slice selection assistance information (S-NSSAI). NR may allow a UE to be simultaneously connected and served by, e.g., at most eight S-NSSAIs. On other hand, each cell may support, e.g., tens or even hundreds of S-NSSAIs. For example, in NR, a tracking area can support up to 1024 network slices. The S-NSSAI may include both slice service type (SST) and slice differentiator (SD) fields with a total length of 32 bits or may include just an SST field part in which case the length of S-NSSAI may be just 8 bits. The SST field may have standardized and non-standardized values, and values 0 to 127 may be within the SST range. For instance, an SST value of 1 may indicate that the network slice is suitable for handling 5G eMBB, a value of 2 for indicating handling of URLLC, etc. SD may be operator-defined. One of the identified issues in NR is that some of the enterprise or industrial scenarios have the requirement for service continuity in case the network slice does not exist in the neighboring cells and the UE may move to one of those neighboring cells. In order to provide service continuity, the UE may not have interruption in any of the on-going protocol data unit (PDU) sessions.

A registration area (RA) may include a list of tracking areas (TAs) that support the same network slices from a UE perspective. When a UE registers to the network, it can indicate the network slices to which it might need access (requested S-NSSAIs). The core network may analyze the UE profile and subscription data to verify the list of network slices the UE can have access to. As a result, the core network may send a list of allowed network slices (allowed NSSAIs) to the UE. The list of allowed network slices may be different from or may be a subset of the requested network slices from the UE request in the registration process. The reason for the list being different from or a subset of the requested network slices could be that the UE does not have access to a specific network slice or that the network slice is not supported in the current location (e.g., TA) in which the registration request was initiated. If the allowed network slices contain at least one network slice, then the core network may also configure a RA for that UE. This RA may contain a list of TAs in which all the allowed network slices of the UE are supported. The core network may determine the current TA of the UE from registration request and may determine the network slice support of the neighboring TAs. Based on this information, the core network can configure the list of TAs for the UE in which the network slice support is homogenous for the requesting UE. Once the UE goes outside of the TAs in the RA, the UE may have to perform a RA update, and the core network may re-evaluate the UE requested network slices to configure a new registration area.

In CHO, the UE may be configured with a CHO command containing the target cell configuration and a condition to execute the handover for one or multiple target cells. The condition may be based on radio measurements. In CHO command, the target cell may have reserved contention free random access channel access (CFRA) resources for the UE. When the UE evaluates the CHO condition and the condition holds for a specific target cell, the UE may apply the CHO command and may use the reserved CFRA resources to initiate the random access to the target cell. The UE can be configured with multiple conditions for multiple target cells.

With regard to network slice continuity, there may be various scenarios to support service continuity. For example, the UE may be moving towards an area that does not support at least one of the UE's ongoing network slices, where the target node may fail to accept the UE with at least one of the on-going S-NSSAIs. Under such circumstances, the service(s) for failed on-going network slice(s) may be interrupted for the UE. On this basis, NR may include a network slice remapping method, where the PDU sessions of the non-supported network slice can be remapped onto a supported network slice in line with remapping policies.

CHO may help to avoid too early or too late handover failures by de-coupling the handover preparation phase from the execution phase. However, the success of CHO may depend on the proper configuration of CHO execution condition. If the parameters of the CHO execution condition, e.g., handover offsets, are not set properly, the UE may experience a radio link failure (RLF) in the source cell while evaluating the CHO condition or handover failure (HOF) when trying to perform access to the target cell. Both RLF and HOF may be referred to as a CHO failure (CHOF). CHO recovery may be a feature that has been introduced for CHO in NR to enable fast recovery of the radio link after CHOF. Instead of performing re-establishment, which can be costly in terms of interruption time and signalling overhead, the UE may perform CHO recovery if it supports the feature and the feature has been enabled by the serving cell for the UE. In CHO recovery, the CHO preparations of the target cells are leveraged to perform CHO execution, which may be much faster than a re-establishment.

The steps of a CHO recovery mechanism may include: 1) the UE may perform cell-selection and may select a suitable cell, if any; and 2) if the selected cell has a prepared CHO configuration, the UE may execute the CHO. Otherwise, the UE may perform re-establishment, where the cell selection procedure may be per UE implementation. A problem is that, during CHO recovery, the UE may select one suitable cell (out of many) that is not optimal for network slice remapping or network slice support, which might result in dropping a PDU session after executing a CHO (if the selected cell has a CHO configuration) or performing re-establishment (if the selected cell does not have a CHO configuration).

Some embodiments described herein may provide for CHO execution with network slice service continuity prioritization. For example, certain embodiments may provide for enabling service and/or network slice continuity for UEs performing CHO recovery after a CHO failure. In a first example embodiment, a radio resource control (RRC) reconfiguration message sent by a source radio access network (RAN) node to the UE may include, for each CHO configuration, an associated network slice-related priority index. The slice-related priority index can be configured by the network considering the network slice support and network slice remapping in the target cell of handover. The UE may take this index into account when selecting a suitable cell during CHO recovery. In a second example embodiment, the RRC reconfiguration message sent by a source RAN node may include, for each CHO configuration, an associated network slice support information of the candidate target cell. The message may also include network slice remapping information for any network slice associated with one of the candidate target cells. Using the above network slice-related information received from the network, the UE can prioritize the cell to select during CHO recovery in case more than one suitable cell is available. A suitable cell may include a cell that is associated with one or more metrics that satisfy a cell selection threshold. For example, the one or more metrics may include a signal strength-related measurement (e.g., in decibels (dBs)).

FIG. 1 illustrates an example 100 of CHO execution with network slice service continuity prioritization, according to some embodiments. As illustrated in FIG. 1, the example 100 may include a UE, a source gNB (supporting and/or controlling network slice 1 ("Slice 1")), a target gNB 2 (supporting and/or controlling network slice 2 ("Slice 2")), a target gNB 3 (supporting and/or controlling network slice 3 ("Slice 3")), and a target gNB 1 (supporting and/or controlling the network slice 1). Each of the gNBs may be associated with (e.g., may support or control) a cell (e.g., target gNBs 1, 2, and 3 may be associated with target cells 1, 2, and 3, respectively). For the example 100, the UE may be served by the source gNB supporting network slice 1 and controlled by the source gNB.

As illustrated at 102, the source gNB may transmit, and the target gNBs may receive, a CHO request and/or information related to a PDU session for the network slice 1. For example, the source gNB may transmit a CHO request to candidate target cells associated with target gNBs 1, 2, and 3 supporting network slices 1, 2, and 3, respectively. As illustrated at 104, the target gNB 2 may transmit, and the source gNB may receive, a CHO request acknowledgement (ACK) indicating a CHO with a re-mapping from network slice 1 to network slice 2. For example, the target gNB 2 may acknowledge the CHO request and may indicate, to the source gNB, that the network slice 1 is to be remapped to network slice 2. As illustrated at 106, the target gNB 3 may transmit, and the source gNB may receive, a CHO request ACK indicating a CHO with remapping is not possible for network slices. For example, the target gNB 3 may acknowledge the CHO request but may indicate, to the source gNB, that the network slice 1 is not to be remapped (e.g., the target cell 3 may admit other PDU sessions corresponding to network slices that are supported by the target gNB 3). As illustrated at 108, the target gNB 1 may transmit, and the source gNB may receive, a CHO request ACK that indicates a CHO with no remapping. For example, the target gNB 1 may acknowledge the CHO request. The PDU session of the network slice 1 may be admitted as it is supported by the target gNB 1.

As illustrated at 110, the source gNB may determine a CHO configuration comprising network slice-related priority indices and/or network slice support and/or remapping information for prepared target cells. For example, based on the received CHO request responses from the target gNBs 1, 2, and 3, the source gNB may determine the network slice-related priority indices and/or network slice support and/or remapping information for the prepared target cells. In some embodiments, the source gNB may include an information element (IE) in the CHO configuration to indicate the priority of each CHO configuration associated with a prepared target cell. For example, the priority for the CHO configuration of target cell 1 may be set to the highest priority value 1 based on there being just an ACK for the CHO request, a priority for target cell 2 may be set to 2 based on the indication that the network slice 1 is not to be remapped, and a priority for target cell 3 may be set to 3 based on the indication that the network slice 1 is to be remapped.

Additionally, or alternatively, the source gNB may indicate, in the CHO configuration, network slice support information and/or network slice remapping information with an information element included in the CHO configuration. For example, the source gNB may indicate that the target cell 1 supports network slice 1, that, for the target cell 2, the network slice is to be re-mapped, and that, for the target cell 3, there is no re-mapping and that the PDU is to be dropped. Additionally, or alternatively, the source gNB may indicate, in the CHO configuration, a network slice identifier supported by each target cell corresponding to the target gNBs. For example, the source gNB may indicate that the target cell 1 supports network slice 1, that the target cell 2 supports network slice 2, and that the target cell 3 supports network slice 3. Additionally, or alternatively, the source gNB may, in the CHO configuration, indicate network slice support information and/or network slice remapping information of each target cell. For example, the source gNB may indicate that target cell 1 supports network slice 1, may indicate that target cell 2 supports network slice 2 and may include a list of remapped network slice tuples in the CHO configuration (e.g., network slice X is mapped to network slice Y), and may indicate that target cell 3 supports network slice 3 and may include a list of remapped network slice tuples in the CHO configuration.

As illustrated at 112, the source gNB may transmit, and the UE may receive, an RRC reconfiguration that includes the network slice-related priority indices and/or network slice support and/or remapping information for the prepared target cells. For example, the source gNB may send the CHO reconfiguration to the UE through an RRC reconfiguration message. The CHO configuration may include a priority index encoded as an external (outside the CHO configuration) information element associated with each CHO configuration in the RRC reconfiguration message determined by the source gNB. Additionally, or alternatively, the CHO configuration may include network slice-related information (e.g., network slice support and/or network slice remapping information) for the prepared target candidate cell having each of a CHO reconfiguration.

As illustrated at 114, the UE may detect a CHO failure. For example, the UE may detect the CHO failure based on experiencing an RLF or the UE may detect the CHO failure based on executing a CHO and experiencing a handover failure (HOF). As illustrated at 116, the UE may perform a CHO recovery using the network slice-related priority indices and/or network slice support and/or remapping information for prepared target cells. For example, the UE may determine a list of suitable cells. A suitable cell may include a cell that is associated with one or more metrics that satisfy a cell selection threshold. For example, the one or more metrics may include a signal strength-related measurement (e.g., in decibels (dBs)). If available, the UE may select a prepared CHO candidate cell from the suitable cell list. The UE may consider the external priority IE associated with each CHO candidate received when selecting the final candidate cell (among the suitable cells) for CHO execution. For example, if target cell 1 and a target cell 3 are both suitable cells, the UE may select target cell 1 having the highest priority for CHO execution. In certain embodiments, the UE may determine its own network slice-based priority based on the re-mapping or support information received for each prepared target cell, and may take this priority into account in the selection of the candidate cell for re-selection. As illustrated at 118, the UE may initiate CHO with selected target cell based on corresponding priorities. For example, the UE may initiate CHO with target cell 1 based on the example priorities described above.

As described above, FIG. 1 is provided as an example. Other examples are possible, according to some embodiments.

Figure 2:
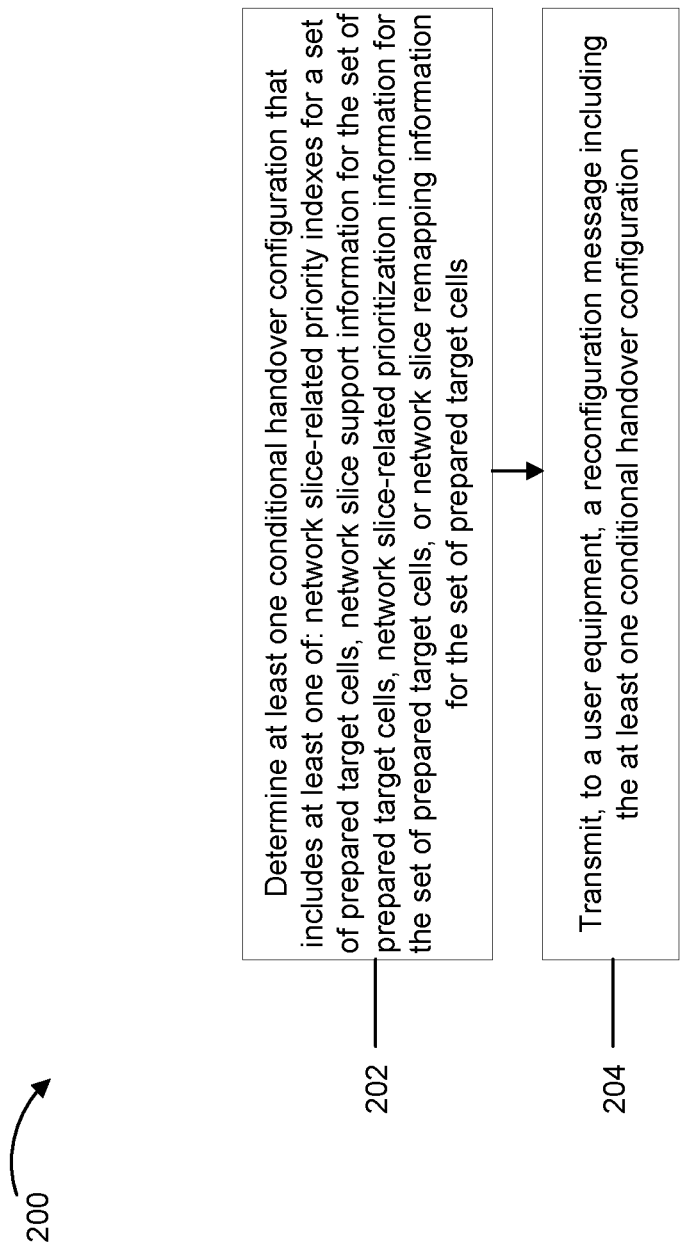
FIG. 2 illustrates an example flow diagram of a method, according to some embodiments.

FIG. 2 illustrates an example flow diagram of a method 200, according to some embodiments. For example, FIG. 2 may illustrate example operations of a network node (e.g., apparatus 10 illustrated in, and described with respect to, FIG. 4a). In an embodiment, FIG. 2 may illustrate example operations of a source gNB of FIG. 1. Some of the operations illustrated in FIG. 2 may be similar to some operations shown in, and described with respect to, FIG. 1.

In an embodiment, the method 200 may include, at 202, determining at least one conditional handover configuration, e.g., in a manner similar to that at 110 of FIG. 1. The at least one conditional handover configuration may include at least one of: network slice-related priority indexes for a set of prepared target cells, network slice support information for the set of prepared target cells, network slice-related prioritization information (e.g., that may include network slice-related indexes) for the set of prepared target cells, or network slice remapping information for the set of prepared target cells. The method 200 may include, at 204, transmitting, to a user equipment, a reconfiguration message including the at least one conditional handover configuration, e.g., in a manner similar to that at 112 of FIG. 1.

The method 200 illustrated in FIG. 2 may include one or more additional aspects described below or elsewhere herein. In some embodiments, the network slice-related priority indexes or the network slice-related prioritization information may indicate a preference among the set of prepared target cells. In some embodiments, the method 200 may further include receiving a conditional handover acknowledgement from at least one of the set of prepared target cells and the determining at 202 may include determining the at least one conditional handover configuration based on the received conditional handover acknowledgement. In some embodiments, the conditional handover acknowledgement may indicate a conditional handover with a remapping from a first network slice to a second network slice, e.g., in a manner similar to that at 104 of FIG. 1. In some embodiments, the conditional handover acknowledgement may indicate that a conditional handover with remapping is not possible for network slices, e.g., in a manner similar to that at 106 of FIG. 1. In some embodiments, the conditional handover acknowledgement may indicate a conditional handover with no remapping, e.g., in a manner similar to that at 108 of FIG. 1.

In some embodiments, the reconfiguration message may include an information element that indicates the network slice-related prioritization information or the network slice-related priority indexes. In some embodiments, the reconfiguration message may include an information element that indicates the network slice support information or the network slice remapping information. In some embodiments, the reconfiguration message may include a radio resource control reconfiguration message. In some embodiments, the network slice support information, the network slice-related prioritization information, or the network slice remapping information may be signaled as an information element (a stand-along information element) at a message level (which can be decoded on its own).

As described above, FIG. 2 is provided as an example. Other examples are possible according to some embodiments.

Figure 3:
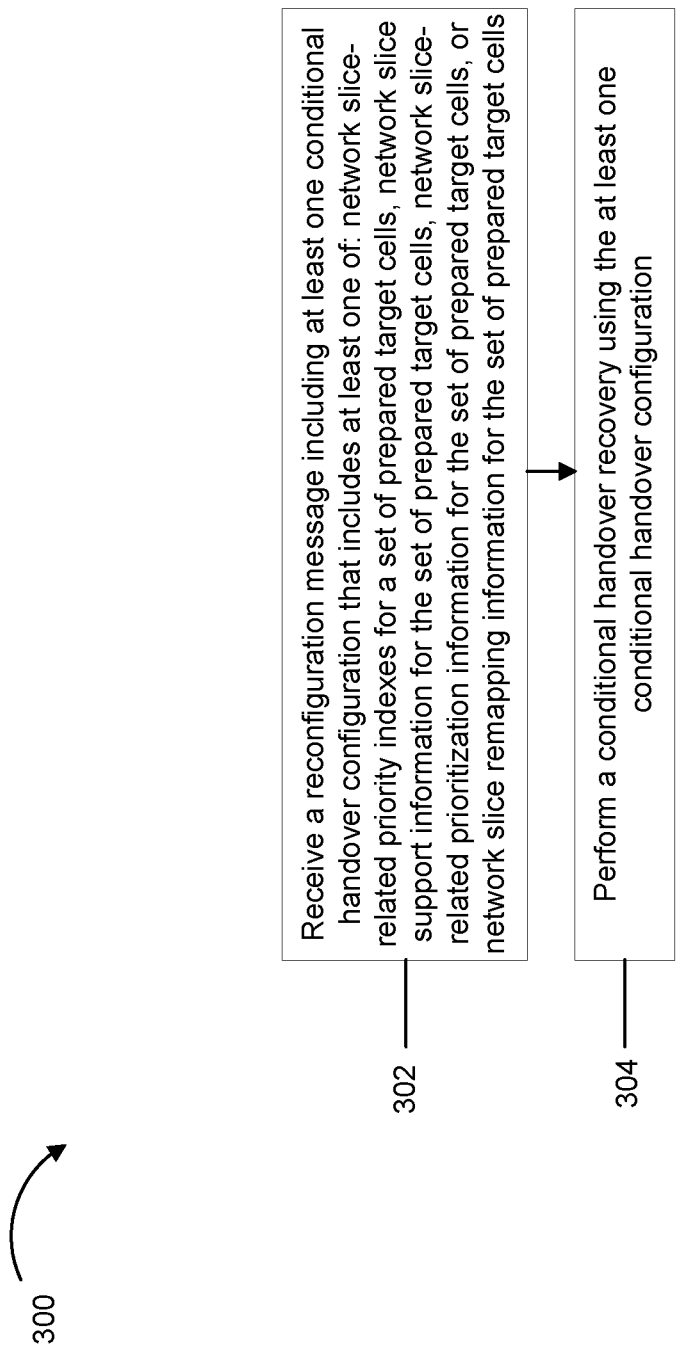
FIG. 3 illustrates an example flow diagram of a method, according to some embodiments.

FIG. 3 illustrates an example flow diagram of a method 300, according to some embodiments. For example, FIG. 3 may illustrate example operations of a UE (e.g., apparatus 20 illustrated in, and described with respect to, FIG. 4b). Specifically, FIG. 3 may illustrate example operations of the UE of FIG. 1. Some of the operations illustrated in FIG. 3 may be similar to some operations shown in, and described with respect to, FIG. 1.

In an embodiment, the method 300 may include, at 302, receiving a reconfiguration message including at least one conditional handover configuration, e.g., in a manner similar to that at 112 of FIG. 1. The at least one conditional handover configuration may include at least one of: network slice-related priority indexes for a set of prepared target cells, network slice support information for the set of prepared target cells, network slice-related prioritization information for the set of prepared target cells, or network slice remapping information for the set of prepared target cells. The method 300 may include, at 304, performing a conditional handover recovery using the at least one conditional handover configuration, e.g., in a manner similar to that at 116 of FIG. 1.

The method 300 illustrated in FIG. 3 may include one or more additional aspects described below or elsewhere herein. In some embodiments, the performing at 304 may include performing the conditional handover recovery using the conditional handover configuration to prioritize among suitable cells in a cell selection process during a conditional handover recovery. In some embodiments, the performing at 304 may include determining a set of suitable cells from the set of prepared target cells, and selecting one or more cells among the set of suitable cells using the conditional handover configuration. In some embodiments, the selecting of the one or more of the set of suitable cells may include selecting the one or more cells among the set of suitable cells based on the network slice-related prioritization information or the network slice-related priority indexes, or selecting the one or more cells among the set of suitable cells based on the network slice support information or the network slice remapping information. In some embodiments, the reconfiguration message may include an information element that indicates the network slice-related prioritization information or the network slice-related priority indexes. In some embodiments, the reconfiguration message may include an information element that indicates the network slice support information or the network slice remapping information. In some embodiments, the reconfiguration message may include a radio resource control reconfiguration message. In some embodiments, the network slice support information is received as an information element (a stand-alone information element) at a message level (which can be decoded on its own). In some embodiments, the method 300 may include decoding the information element without completely decoding the reconfiguration message.

As described above, FIG. 3 is provided as an example. Other examples are possible according to some embodiments.

FIG. 4a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB) (e.g., a source gNB or a target gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIG. 1 or 2. For instance, apparatus 10 may be controlled by memory 14 and processor 12 to perform the method of FIG. 2.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1 and 3. For instance, in one embodiment, apparatus 20 may be controlled by memory 24 and processor 22 to perform the method of FIG. 3.

In some embodiments, an apparatus (e.g., apparatus 10 and/or apparatus 20) may include means for performing a method or any of the variants discussed herein, e.g., a method described with reference to FIG. 2 or 3. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is the taking into account of network slice support and remapping of prepared target cells during the CHO recovery procedure. This may minimize the cases where PDU session have to be dropped unnecessarily because the UE has executed CHO to a target cell not supporting the needed slice or slice remapping. Additionally, or alternatively, another example benefit of some example embodiments is that, during CHO recovery, the UE may be made aware of the prepared target cells that support slice remapping which cannot be determined by decoding the CHO configuration. Additionally, or alternatively, during the CHO recovery, the UE may not have to decode the CHO configuration to check if the network slice is supported for a CHO candidate or not. In this way, the UE may save decoding complexity by evaluating the external network slice related IEs associated with each CHO configuration and/or target cell. Additionally, or alternatively, the certain embodiments may provide the network with the capability to steer the CHO execution of the UE in CHO recovery to the right target cells, if possible, by tuning the parameters of the slice priorities or providing the slice support and/or remapping information of the target cell to the UE. Accordingly, the use of some example embodiments results in improved functioning of communications networks and their nodes and, therefore constitute an improvement at least to the technological field of CHO recovery, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural wording is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

AMF Access and Mobility Management Function
BS Base Station
CHO Conditional Handover
S-NSSAI Single Network Slice Selection Assistance Information
UE User Equipment

We claim:

1. An apparatus, comprising:
   at least one processor; and
   at least one memory including computer program code,
   wherein the at least one memory and the computer program code are configured to, with the at least one processor, cause the apparatus at least to:
   determine at least one conditional handover configuration, wherein the at least one conditional handover configuration comprises at least one of network slice-related priority indices for a set of prepared target cells or network slice remapping information for the set of prepared target cells; and
   transmit, to a user equipment, a reconfiguration message comprising the at least one conditional handover configuration, wherein the reconfiguration message comprises an information element that indicates the network slice remapping information.

2. The apparatus according to claim 1 wherein the network slice-related priority indices or the network slice-related prioritization information indicates a preference among the set of prepared target cells.

3. The apparatus according to claim 1, wherein the at least one memory and the computer program code are configured to, with the at least one processor, further cause the apparatus at least to:
   receive a conditional handover acknowledgement from at least one of the set of prepared target cells; and
   wherein the at least one memory and the computer program code are configured to, with the at least one processor, when determining the at least one conditional handover configuration, further cause the apparatus at least to:
   determine the at least one conditional handover configuration based on the received conditional handover acknowledgement.

4. The apparatus according to claim 3, wherein the conditional handover acknowledgement indicates that a conditional handover with remapping is not possible for network slices or,
   wherein the conditional handover acknowledgement indicates a conditional handover with a remapping from a first network slice to a second network slice, or
   wherein the conditional handover acknowledgement indicates a conditional handover with no remapping.

5. The apparatus according to claim 1, wherein the reconfiguration message comprises an information element that indicates the network slice-related priority indices.

6. An apparatus, comprising:
   at least one processor; and
   at least one memory including computer program code,
   wherein the at least one memory and the computer program code are configured to, with the at least one processor, cause the apparatus at least to:
   determine at least one conditional handover configuration, wherein the at least one conditional handover configuration comprises at least one of network slice-related priority indices for a set of prepared target cells or network slice remapping information for the set of prepared target cells; and
   transmit, to a user equipment, a reconfiguration message comprising the at least one conditional handover configuration,
   wherein the network slice remapping information is signaled as an information element at a message level.

7. An apparatus, comprising:
   at least one processor; and
   at least one memory including computer program code,
   wherein the at least one memory and the computer program code are configured to, with the at least one processor, cause the apparatus at least to:
   receive a reconfiguration message comprising at least one conditional handover configuration, wherein the at least one conditional handover configuration comprises at least one network slice remapping information for a set of prepared target cells; and
   perform a conditional handover recovery using the at least one conditional handover configuration.

8. The apparatus according to claim 7, wherein the at least one memory and the computer program code are configured to, with the at least one processor, when selecting the one or more of the set of suitable cells, further cause the apparatus at least to:
   select the one or more cells among the set of suitable cells based on network slice-related priority indices.

9. The apparatus according to claim 8, wherein the reconfiguration message comprises an information element that indicates the network slice-related priority indices.

10. The apparatus according to claim 9, wherein the at least one memory and the computer program code are configured to, with the at least one processor, further cause the apparatus at least to:
    decode the information element without completely decoding the reconfiguration message.

11. The apparatus according to claim 7, wherein the at least one memory and the computer program code are configured to, with the at least one processor, when performing the conditional handover recovery using the conditional handover configuration, further cause the apparatus at least to:
- perform the conditional handover recovery using the conditional handover configuration to prioritize among suitable cells in a cell selection process during a conditional handover recovery.

12. The apparatus according to claim 7, wherein the at least one memory and the computer program code are configured to, with the at least one processor, when performing the conditional handover recovery using the conditional handover configuration, further cause the apparatus at least to:
- determine a set of suitable cells from the set of prepared target cells; and
- select one or more cells among the set of suitable cells using the conditional handover configuration.

13. The apparatus according to claim 12, wherein the at least one memory and the computer program code are configured to, with the at least one processor, when selecting the one or more of the set of suitable cells, further cause the apparatus at least to:
- select the one or more cells among the set of suitable cells based on the network slice remapping information.

14. The apparatus according to claim 7, wherein the reconfiguration message comprises an information element that indicates the network slice remapping information.

* * * * *